Oct. 16, 1934.    F. B. ADAM    1,977,032

PANELBOARD

Filed Feb. 24, 1931

INVENTOR
FREDERICK B. ADAM
BY
Eilers & Schaumberg
ATTORNEYS

Patented Oct. 16, 1934

1,977,032

UNITED STATES PATENT OFFICE 1,977,032

PANELBOARD

Frederick B. Adam, St. Louis, Mo., assignor to Frank Adam Electric Co., St. Louis, Mo., a corporation of Missouri Application February 24, 1931, Serial No. 517,917

12 Claims. (Cl. 175—371)

An object of the present invention is to construct a panelboard section in such a manner that certain of the essential parts of the unit are molded, in an improved manner, into a body of insulating material, while other parts may be riveted into position, or otherwise permanently assembled to form a unitary structure.

Another object of the invention is to provide a panelboard section in which a switch and other metal or conducting portions may be assembled by molding such portions in place in a matrix of a molded insulating material, whereby there is eliminated any possibility of loosening of parts and thereby assuring uninterrupted service.

An additional object of the invention is to construct a panelboard section in such a manner that the bus bar contacts will be readily accessible, and will be in such a position that they may be brought into contact with the bus bars by manipulation of the panelboard section itself, without the necessity of employing screws or any similar fastening device, either for the purpose of assembling the panelboard sections, or for making contacts with the bus bars.

Still a further object of the invention is to provide a means in a panelboard section whereby the switch parts or any other energized parts of the assembly are prevented from accidently coming into unintended contact with conducting elements adjacent to, or associated with the assembly.

Yet another object is attained in the elimination of screws, bolts and like holding members for securement of a panelboard section in its assembled relation to the bus bars, or feeder elements, as well as in assembled relation with other similar sections, the present example of the invention including provision for a frictional engagement of the panel section with a bus bar in order to effect both electrical and mechanical connections of the section with other portions of the assembly.

Figure 1:
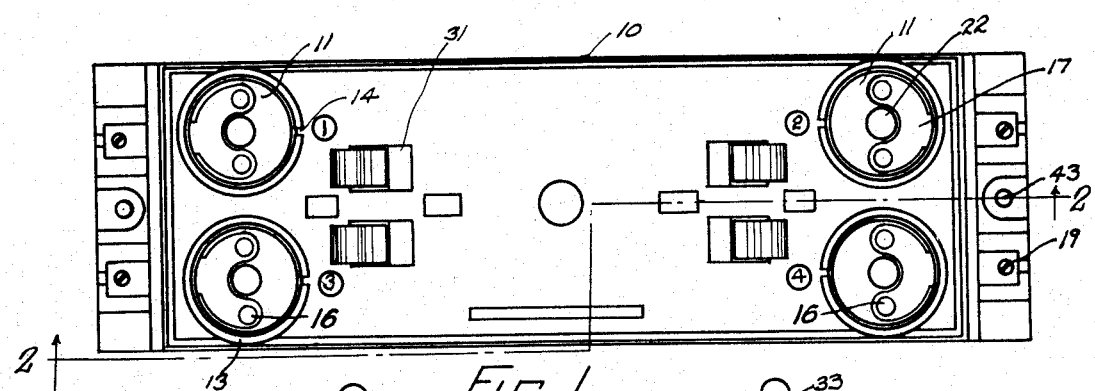
Figure 2:
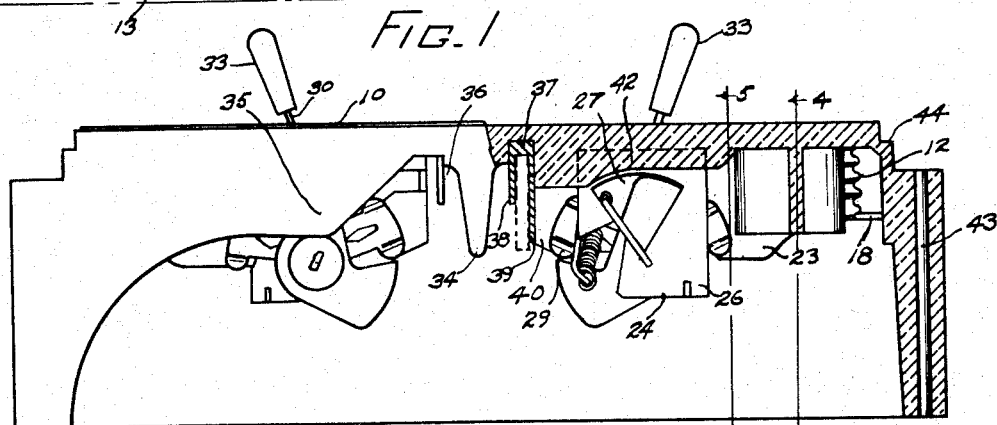
Figure 4:
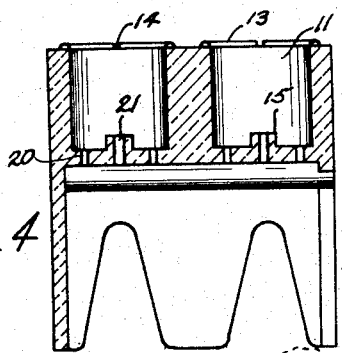
Figure 3:
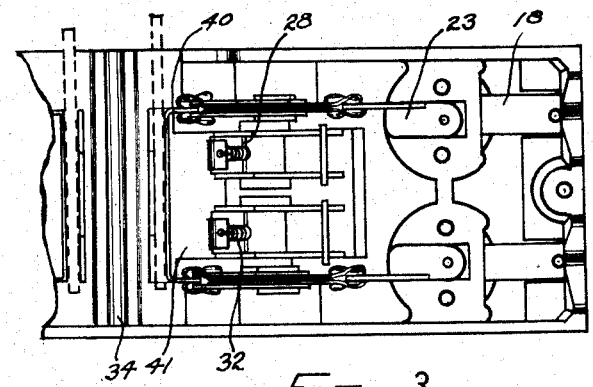
Figure 5:
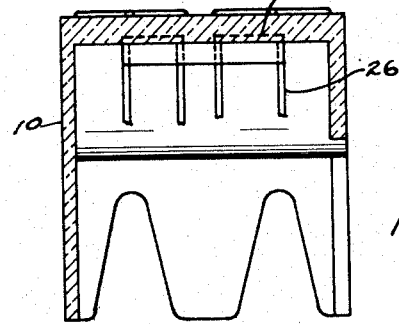
Figure 6:
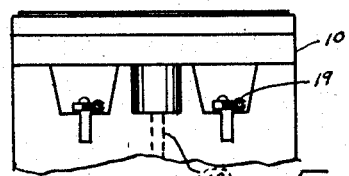

Further objects and advantages will appear from the following detailed description of the preferred embodiment of the assembly and its parts, as illustrated by the accompanying drawing, in which:

Fig. 1 is a top elevation of a panelboard section embodying features of the present invention; Fig. 2 is a side elevation of the assembly, partly in section along line 2—2 of Fig. 1, and showing especially the bus bar connection and the arrangements for securing certain of the parts in position, and assembly into the unit or section, by molding in place; Fig. 3 is a bottom view of half of the assembly, the opposite half being symmetrical with the part shown, and identically equipped; Fig. 4 is a sectional view of the insulating body, as taken along the line 4—4 of Fig. 2, showing in particular the receptacles for the fuse shells, formed as integral parts of the molded structure; Fig. 5 is a sectional view of the insulating body and certain parts of the switch, this figure being taken along the line 5—5 of Fig. 2, showing especially the method of embedding parts of the switch assembly in the matrix of insulating material, and the arrangement for prevention of unintended contact between the switch assembly and wiring thereto, as referred to in the objects above stated, and Fig. 6 is a fragmentary end elevation of the sectional unit appearing in Fig. 1.

To give a clearer understanding of the advantages of the present invention, there may be described briefly the usual arrangement of parts of a panelboard to which the present invention is applicable as a unit. Generally, at least a pair of vertical bus bars, arranged in parallel adjacence, are centrally located within a wall cabinet or enclosure. Each unit, of which this invention is an embodiment, is electrically and mechanially connected to the bus bars so that it will lie in a horizontal position, with its front or face in a vertical plane. A number of such units, lying one above another, serve collectively to constitute a panelboard.

As shown in Fig. 1, the terminals to which the branch or load circuit wires are connected, are disposed at the ends of each unit or section, and extend about the outside of the panelboard proper, within a wire gutter extending about the inner periphery of the panelboard cabinet. In a "dead front" type of structure, such as presently preferred, a trim or the like, serves normally to complete the closure of the wire gutter, and prevents manual contact with the wiring therein. Within the wire gutter the wires extending into the cabinet are distributed to their designated switches. To provide for a neat and systematic arrangement of the wires, the group of wires is brought up within the wire gutter, along one side of the panel, laid across the top unit, and then brought down to the lowermost unit. It will be understood that some protective means for the panel should be provided for on the top unit in order to prevent these wires from coming into contact with either the switch mechanism or the bus bars. For this reason the top unit has an additional lateral barrier or closure member for one side of the section. This feature is shown in section in Figs. 4 and 5 of the drawing, and in elevation in Fig. 2. This provision is preferably not incorporated into all the units, since the manner in which they are connected to the bus bars would prohibit its use, as shown, except at the extremities of the panelboard.

Referring now by characters of reference to the drawing, 10 indicates, generally, the body portion of one section or unit of a panelboard, and into which the switches and other conducting parts are assembled. It will be understood that this body, according to the present example, is molded as a single piece, and formed of a dielectric substance. Integral with, and disposed substantially within the corners of the body, are fuse receptacle sockets 11, the formation of which is accomplished during the process of molding. The sockets 11 provide depressions into which metal fuse plug receptacles 12 can be riveted. On the top surface or face of the body, and extending about each of the openings about each socket, is an elevated ridge 13. These ridges not only provide for a neat appearing construction, but serve to guard against any accidental contact with the receptacles 12. A slot 14 is, by preference, provided in each ridge 13, the purpose of which is to enable intended contact with the fuse sockets for test purposes. For example, one terminal of a test lamp may be inserted into the slot, thereby making contact with the plug fuse receptacle 12, which is readily understood to be in contact with the plug fuse, and the other test-lamp terminal brought in contact with the bus bar, thereby shunting the fuse out of the circuit. The receptacles 12, above referred to, may be of conventional conformity, but the means by which they are secured in assembly in the described embodiment, is believed distinguishable from prior practice. The bottom of the shell has a centrally located aperture (not shown) which receives and accommodates an extended insulating portion 15 of the body of the unit, which extension has a purpose hereinafter appearing.

Partly overlying the bottom of each of the receptacles 12 there is, by preference, a bifurcated portion 17 constituted by one end of a terminal member 18, and the legs of which are apertured. From the receptacle, the member 18 is extended endwise of the section, and passes through an opening (not shown) in the side of the receptacle. This side of the corresponding socket 11 being open, the member 18 is thence extended substantially to the outer end of the section, where it is provided with a terminal 19. The terminal 19 and associated connection facilities form the subject matter of a copending application of Henry M. Stieglitz, Serial No. 333,663, filed January 19, 1929. It will appear that each of the members 18 is provided with an individual connector, whereby each of the switches and fuse sockets serves an individual branch circuit. Assembly of parts 12, 17 and 18 to the socket 11, is effected by disposing the receptacle 12 and the member 17 with their respective apertures coincident with apertures 20 (Fig. 4), in the base of the socket, after which rivets 16 are inserted in the coincident apertures, and upset to secure the parts together. This method of fastening insures a fixed and substantial securement of the shell to the insulating body, and also as a rigid connection between the shell and the connecting member 18. The above mentioned extension 15, of insulating material, is provided by preference, with a centrally located aperture 21 which serves to accommodate a rivet, the head of which forms the central contact 22 for a plug fuse disposed in the receptacle 12. This rivet not only provides at one end a contact for a fuse, but its opposite end serves to engage a contact member 23, serving structurally to secure this member to the bottom of the socket 11, and hence to the body of the unit. As shown in Figs. 2 and 3, the member 23 is provided with a bent or flange portion so that its free end serves as a fixed switch contact for engagement by the movable switch mechanism, hereinafter to be described. It will appear that each of the fuse receptacles is similarly provided with a member 23, including a fixed switch contact so that in the example illustrated, four branch circuits may be separately fused and switched through each sectional unit of the panelboard.

The type of switch employed in the present unit or section, may be that described and claimed in United States Letters Patent No. 1,786,727, issued December 30, 1930. For purposes of present description, it is sufficient to note that each switch mechanism includes a frame 24 preferably formed of metal, and having a horizontal upper portion 25 with parallel sides 26 extending downwardly therefrom. The horizontal portion 25, as best seen in Fig. 5, is substantially embedded into the body at the time of molding, and thus secured in place. This method of positioning the frame portion of the switch mechanism eliminates the necessity of using any fastening means, and also prevents the switch from becoming loosened relative to the body of the unit. In each side 26 of the frame is an aperture 27, preferably of V shape. The aperture 27 serves the purpose of permitting a movable switch bridge 28, to be inserted in, and removed from the frame 24. Attached to the switch bridge 28, exteriorly of the switch frame, are the switch blades 29. At 30 is shown a switch actuating lever passing through an aperture in the horizontal portion 25, and thence through an opening 31 in the face or front of the unit. Attached to the lower extremity of the switch actuating lever, is a spring 32, this connection being made to the inner or lower end of the spring. The other end of this spring is connected to the switch bridge 28. By the present arrangement of the spring, bridge and switch lever, I am able to throw over the switch bridge from the "off" position to the "on" position, by the action of the spring 32 under tension, and to actuate the switch between the "on" and "off" positions, by first starting it with the switch lever, and completing the action by tension of the spring.

As a convenient means for actuating the levers 30, each lever may be provided just forward of the face of the unit, with a handle 33 which may conveniently be formed of a molded dielectric material.

It will appear from Figs. 1 and 2 that the section or unit is symmetrically constructed, with respect to a transverse median line. As best appears in Figs. 2 and 3, a central transverse barrier 34 is provided for the purpose of disposing an insulating member between the switch mechanism carried by the halves of the unit, and the adjacently located bus bars. This barrier serves also the purpose of centrally reinforcing the body of the unit, since it operates as a transverse stiffening member. The sides of the section may each be provided with an apron or flange 35, preferably formed integrally with the body of the unit. This apron is notched on each side of the barrier 34, to accommodate the bus bars, the notches being shown at 36.

Adjacent each opposite side of the barrier 34, is a fixed contact assembly 37. The contact members 37 are so disposed as to complete the circuits between the bus bars and the branch terminals 19, through the switch blades, when the switches are closed. It will be seen from Figs. 2 and 3, that each member 37 is, by preference, constructed in the form of a channel of U shape in section, thereby enabling it to accommodate a member of strip form, such as a bus bar when presented edgewise to the section. This construction provides for effective contact between the member 37 and bus bars of usual form. Also it is understood that this form of construction of the bus bar contacts permits the section or unit to be easily attached to the bus bar, which attachment may be made solely by manipulation of the section itself in such a manner as to cause the legs 38 and 39 of the member 37 to engage opposite lateral surfaces of the bus bar the leg portions of the contact being of sufficient inherent resilience to effect a firm frictional engagement with the bus, whereby the unit may be structurally positioned in the panelboard assembly, and by the same provision, electrically connected with the busses or feeders. It will, of course, appear that as different shapes of bus members are employed different shapes of contact clips 37 may be utilized, so as to preserve the frictional relation of parts, and provide a desirable area of contact. Considering the dimension of the member 37, transverse of the section, as its length, as shown in Fig. 3, the leg 38 is, by preference, shorter than the leg 39. This arrangement permits the member 37 to be more securely embedded into the insulating body, as will hereinafter appear. The leg 39 is provided with fixed switch contacts 40, bent through an angle of 90 degrees so as to lie in planes transverse to the axis of the contact clip.

The member 37, as appears from Fig. 2, is partly embedded into the insulating material as above described, thereby eliminating the necessity of screws or bolts to fasten the contact member to the body of the unit, and avoiding the necessity for projecting such holding members through to the face of the unit or the panelboard. As best appears from Figs. 2 and 3 there is provided adjacent the leg 39 of the member 37 a block portion 41 constituted by an integral depending part of the insulating body. This block serves as a lateral reinforcement for the leg 39, and extends endwise of the section to form a depending portion 42 disposed between each adjacent pair of the switch frames and serving as a spacer and barrier therebetween. This portion of the insulation also serves partially to embed the horizontal portions of the switch frame, more deeply into the body of the unit. By preference the leg 39 is apertured as shown in Fig. 2, and the material in block 41 extended into such aperture at the time of molding, to aid in structurally uniting the member 37 and the body of the unit.

While the facilities afforded by the member 37 serve adequately for positioning the unit frictionally on the bus bar, it may be, according to conditions of the particular installation, desirable to secure the section or unit, structurally, to a mounting back or other portion of a cabinet. To this end there are provided, at the opposite ends of the section, apertures 43 extending substantially over the depth of the section, and between the paired terminal connections at the ends thereof. It will, of course, be understood that the use of a screw or bolt in connection with the openings 43 serves in nowise to affect the dead front characteristics of the section since the extreme end portions thereof are protected by the usual return which is preferably provided in connection with the front or trim of the panelboard cabinet. As a convenience for locking the return and sections relative to each other I prefer to provide a rabbet 44 at each end of the section, particularly so as to maintain the inner or free end of the return in spaced relation from the contacts 19 and connector strips 18.

The manner of use of the described sectional unit in connection with a panelboard, is thought to be fully apparent from the preceding detailed description of parts, but may be briefly referred to as follows: In connection with an assembly of units such as the one presently described there is preferably employed a similar unit (not shown) which serves the purpose of a collector for the neutral sides of each of the several branch circuits. To such a section the neutral central bus bar of the usual three wire system may be connected. The remaining bus bars are connected, according to present preference, one to each of the fixed contact members 37 in each of the switching sections of the panelboard. When a given switch is brought to its closed position, the live side of the branch circuit into which it is connected, is energized through the associated fixed contact 40, thence through the movable switch contacts 29, through the bridge member of the switch, thence into the contact 23, to the fuse receptacle through the fuse, and out through the contact member 18 and terminal connector 19. It is thus seen that, according to present preference and the present showing, four branch circuits are completely cared for and individually switched and fused, through a single panel section.

The advantages of the present "molded in" construction and method of connecting the various conducting portions and switch elements into the body of the unit will be at once apparent to those skilled in the art. This construction eliminates all threaded fastening means in assembly of the parts of a sectional unit, except of course for the threaded terminal portions 19. The structure from the point of view of internal assembly is thus rendered secure against any loosening of parts due to vibration or careless handling, and the section as initially formed retains its parts always in their intended relative relations. With respect to the advantages accruing by reason of the frictional engagement of the member 37 with the bus bars, this expedient minimizes the time required for connecting the section into the circuits, since it eliminates the heretofore laborious expedients for securing the section to the bus bars by means of screws or the like, usually necessary to be placed or driven from the back of the panelboard or sections.

It will, of course, be understood that the present detailed description of parts and the accompanying drawing relate to a preferred executional embodiment of the invention and that substantial changes may be made in the described arrangement and construction of parts without departing from the spirit and full intended scope of the invention as defined by the appended claims.

I claim:

1. In a panelboard assembly, a panel section, a switch, a contact clip carried by the panel section, and adapted for frictional engagement with a bus bar, the clip being disposed adjacent the switch, and having a portion adapted to serve as a switch contact.

2. A sectional switching unit adapted for use in a panelboard assembly and including a resilient contact clip of channeled form, adapted for embracing engagement with a bus bar upon manipulation of said unit, the clip being provided with laterally extended switch contacts.

3. In a sectional unit for assembly in a panelboard, a switch carried by the unit, a contact secured to the unit and having a resilient portion adapted frictionally to engage a feeder member, and an extension constituting a contact for the switch.

4. In a panelboard member, a body formed of a molded dielectric material, switches, and combined bus bar cleats and fixed switch contacts, molded in position in the body, a fuse receptacle and a terminal connector, each carried by the body, a metal holding element common to said receptacle and connector, and extending through a portion of the receptacle, a portion of the connector and a portion of the dielectric material forming the body, and an additional fixed switch contact carried by the body and extending into said receptacle.

5. A dead front unit for a sectional panelboard, adapted to be individually removably supported in assembled relation with like units, a bus bar, a switch mounted on the rear of said unit, a switch handle extending from said switch, through the unit, and a resilient, furcate element attached to the rear of said unit, adapted frictionally to engage said bus bar upon movement of the unit into assembled position, one of the furcations of said element being bent laterally to form one terminal of said switch.

6. In a panelboard unit of dead front type, a one-piece dielectric body of molded material having one of its faces forming the dead front, switches arranged rearwardly and towards the ends of the unit, and secured in assembly on said body by molding portions of the switch structure into the body, terminals near the ends of the unit, resilient bus bar clips molded into said body, intermediately of the rear portion of the unit, said clips each having an integral portion thereof formed as a switch contact, a flange portion extending along one side of the body, and provided with recesses in line with said bus bar clips, and a protective wall substantially coextensive with the other side of said body.

7. In a panelboard section, a body of molded dielectric material, a switch mechanism including a switch frame of angulate, metal construction, having one of its angle portions molded into assembled relation with the body, and a bus bar clip molded into said body, said clip having an integral portion forming a switch terminal.

8. A panelboard section of dead front type, including a one-piece molded body of rectangular shape, a switch embodying an angulate metal frame, and a flexible bus bar contact extending from the rear face of the body, portions of the molded material surrounding portions of the metal switch frame, and portions of said contact, and adapted to secure said parts in assembled relation in the section, said bus bar contact being provided with a laterally bent portion on one end forming a stationary switch contact.

9. A sectional panel unit of dead front type, including a molded body having one of its faces forming the dead front, said body being provided with a recess accessible from the front of the unit, a fuse receptacle in said recess, a terminal connection from the receptacle to one end of the unit, a switch on the rear of said unit, the switch being secured to the unit by molding a portion of the switch structure into the molded body, a connection from said receptacle, extending to the rear of the unit, and having its free end formed as a switch contact, a channeled bus bar contact extending transversely of the rear of the unit, said bus bar contact having an integral portion thereof formed as a switch contact, and means integral with the molded body for interlockingly securing the bus bar contact thereto.

10. A sectional panelboard unit of dead front type adapted for electrical association with a bus bar, said unit including a unitary, rectangular body of insulating material, one face of which forms the dead front, the body having a recessed portion, accessible from the front, adapted to receive a plug-type fuse receptacle, a switch on the rear of said unit, a connection from said receptacle, extending to the rear of the unit, and having its free end formed as a switch contact, a bus bar clip extending from the rear of the unit, and adapted to effect a connection with said bus bar upon manipulation of the unit, said bus bar clip having a laterally bent portion on one end forming a switch contact.

11 In a panelboard section composed of a body of molded insulating material, a switch and conducting elements, including frictionally engaging bus bar contacts; the switch mechanism and conducting elements being molded into and supported by the insulating material, and extending from one face of the section, and a switch handle extending through the insulating material to the opposite face of the section; said bus bar contacts being of channeled form, directed transversely of the section, the leg portions of the contacts being partially embedded in, and embraced by, the insulating material of the body, and one leg of each bus bar contact having a laterally bent portion at each end thereof forming fixed switch contacts.

12. In a panelboard member, switches, including contacts carried at the rear of the panelboard member and each having a handle extending through the panelboard member, bus bars suitably positioned at the rear of the panelboard member, and channeled members for frictionally engaging said bus bars, each channeled member being provided with a lateral projection at each end forming contacts for a plurality of said switches.

FREDERICK B. ADAM.